Nov. 3, 1936.   H. HUEBER ET AL   2,059,354
WINDSHIELD CLEANER
Filed April 25, 1932   2 Sheets-Sheet 1
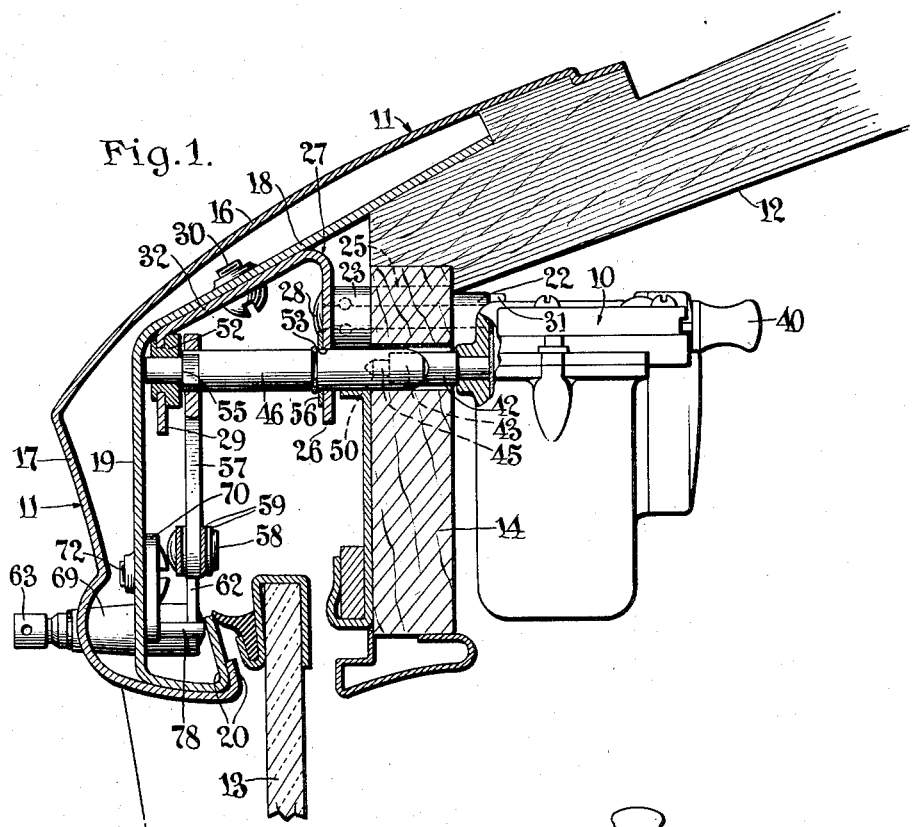

Nov. 3, 1936.   H. HUEBER ET AL   2,059,354
WINDSHIELD CLEANER
Filed April 25, 1932    2 Sheets-Sheet 2
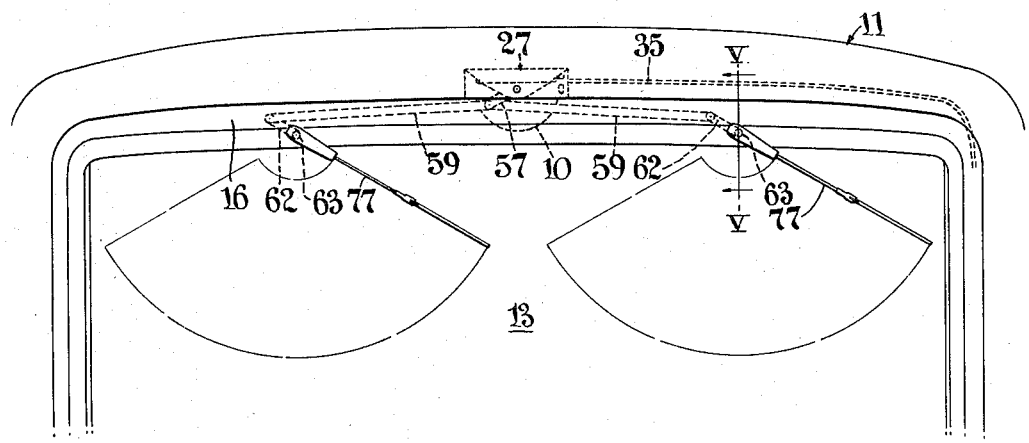
Fig. 3.
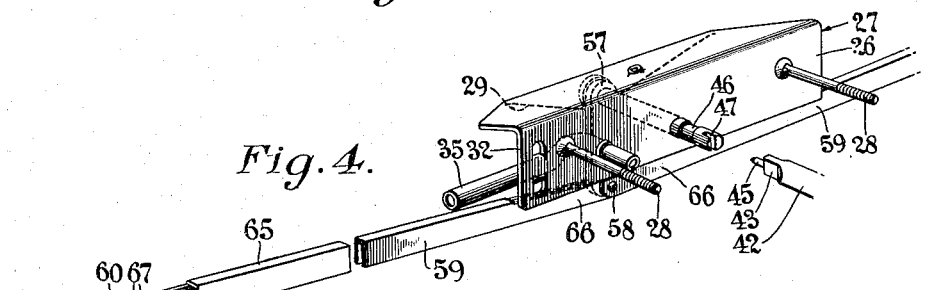
Fig. 4.
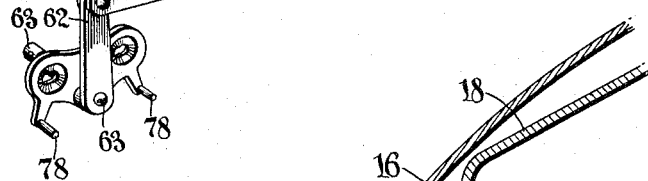
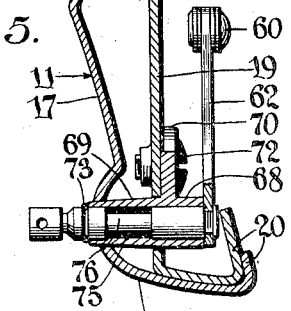
Fig. 5.
INVENTORS
Henry Hueber
BY Erwin C. Horton
Bean + Brooks ATTORNEYS Patented Nov. 3, 1936

2,059,354

UNITED STATES PATENT OFFICE 2,059,354

WINDSHIELD CLEANER

Henry Hueber, Buffalo, and Erwin C. Horton, Hamburg, N. Y., assignors to Trico Products Corporation, Buffalo, N. Y.

Application April 25, 1932, Serial No. 607,457

9 Claims. (Cl. 15—255)

This invention relates to windshield cleaners, and it has particular relation to a construction for transmitting power from a windshield cleaner motor to windshield wipers.

One object of the invention is to provide a unitary construction which is adapted to be employed for operating a plurality of windshield wipers, and in which the mounting is substantially the same construction for one or more wipers.

Another object of the invention is to provide a mechanism for cleaning windshields wherein one wiper linkage may be removed, or if a single wiper unit is originally installed, an additional unit may be installed in connection with the original equipment without altering the mounting or operation thereof.

Another object of the invention is to provide a cooperative mounting construction between a windshield cleaner motor, vehicle frame and wiper actuating mechanism by which each is separably installed and wherein the cleaner motor can be removed without disturbing the remainder of the construction.

In the drawings:

Fig. 1 is a cross section of an upper front portion of a motor vehicle having windshield cleaner mechanism mounted therein;

Fig. 2 is a plan view having parts in horizontal section, of a wiper motor for operating the cleaner mechanism attached thereto;

Fig. 3 is a fragmentary front elevation of an entire cleaner assembly and the front portion of a motor vehicle body;

Fig. 4 is a perspective of a linkage for transmitting power from the wiper motor to wiper blades; and Fig. 5 is a vertical section taken substantially along the line V—V of Fig. 3.

In practicing the invention a windshield wiper motor 10 is mounted upon a transverse header bar construction 11 on a vehicle body top 12 that receives in slidable relation a conventional windshield 13. This header bar construction includes a removable header bar section 14, a trim member 16 having a front inturned flange 17, and an inner transverse angle member 18 having a flange 19 extending downwardly into the inturned portion of the flange 17 to form double inturned internesting portions 20.

Suitable hollow bosses 22 on the cleaner motor register with spacing sleeves 23 that are disposed in openings 25 of the header bar section 14 and are secured to one downwardly extending flange 26 of a channel bracket 27 composed of relatively thin material. Bolts 28 mounted in the sleeves 23 and rigidly secured in the flange 26 are provided with nuts 31 for clamping the bracket 27 and cleaner motor firmly against opposite sides of the header bar section 14. Another downwardly extending flange 29 of the bracket is disposed substantially parallel to the flange 26 and suitable fastening means 30 rigidly secures an intermediate or web portion 32 of the bracket to the inner surface of the angle member 18.

An end portion of a suction tube 35 communicating with a suitable source of differential fluid pressure (not shown) projects through an opening 36 in the bracket flange 26 and is secured in clamped relation by means of ears 37 struck out from the flange. A tubular conduit section 38 extending from the cleaner motor has its outer end normally registering with the end of the tube 35 and a flexible tubular coupling 39 provides for fluid tight passage from the tube 35 to the section 38. The operation of the cleaner motor is controlled by means of a suitable valve member 40.

A wiper shaft 42 oscillatable by the operation of the motor 10 extends through the header bar section 14 and its opposite sides are cut away to form a flat end portion 43 and an axially extending lug 45 at its extremity. One end of a shaft section 46 has a notch 47 and a recess 50 for receiving the flat end portion 43 and the lug 45 respectively. This construction provides a freely detachable connection for transmission of oscillatory movement from the shaft 42 to the shaft section 46 although these shaft members can be disconnected merely by moving them apart axially. The other end of the section 46 is rotatably mounted in a bearing 52 provided rigidly in the flange 29 and the intermediate portion of the shaft is rotatable in an opening 53 in the flange 26 of the channel bracket. In order to prevent axial movement of the shaft 46, a shoulder 55 abutting the bearing 52 is formed upon its outer end, and a washer 56 mounted adjacent the flange 26 cooperates with the shoulder in preventing such movement in either direction.

A downwardly extending arm 57 has one end rigidly mounted upon a shaft section 46 adjacent the shoulder 55 and the other end pivotally supports on a common connection 58 the inner end of a pair of links 59 extending substantially horizontally in opposite directions. Each link has a pivotal connection 60 at its outer end to the upper end of a downwardly extending arm 62 which in turn has an outwardly extending rock arm or wiper operating shaft 63 rigidly secured thereto and disposed through both flanges 17 and 19. The links 59 are composed of relatively thin material bent into channel form, the web portion 65 of which is cut away adjacent the link ends to provide inner and outer pairs of parallel fingers 66 and 67 in which the pivotal connections 58 and 60, respectively, are located.

A bearing support 68 having tubular bearing sections 69 and integral securing plates 70 is secured, as indicated at 72, to the angle member 19. In assembled relation the bearing member is secured to the shaft 63 in unitary form to be mounted upon the members 17 and 19 or upon similar members. Before mounting, the bearing member is supported by the shaft 63. One end of the section 69 bears against the arm 62 and the other end or outer end abuts a ring 73 secured against axial movement on the shaft. Suitable packing material 75 is disposed around a reduced portion 76 of the shaft inside the section 69 for the purpose of carrying a suitable lubricant for the bearing.

From this description it will be apparent that the oscillation of the cleaner motor shaft 42 is transmitted to each wiper operating shaft 63 which has its outer end rigidly secured to a windshield wiper 77. Oscillatory movement of each arm 66 is limited by means of a pair of stops 78 extending rigidly from the bearing plates 70 on opposite sides of the shaft 63. Although the arms 62 are shown to be extending downwardly, it will be apparent that they can likewise be disposed upwardly because the parallel fingers 67 provide for free swinging movement of the arms on opposite sides about the fingers 67. In utilizing this kind of arrangement either one or two wipers can be installed. The construction described is suitable for mounting only one wiper merely by omitting one of the links 59 and its outer end connections. Conversely if only one wiper is at first installed a second can be added without alteration of existing structure other than the boring of openings for bearing sleeve 69 and shaft 63.

Although motor vehicles of the modern type are usually equipped with windshield wiping apparatus, the construction described above may be substituted for original equipment or used as original equipment and it is only necessary to remove the header bar section 14 in order to install the channel bracket 27, and to bore openings in the members 17 and 19 for receiving the bearing sections 69 that support the wiper shaft or rock arm. However, after this portion of the construction has been installed together with the motor on the other side of the header section 14, if it is found to be desirable to remove the motor for the purpose of cleaning or repairing, the latter may be removed independently. This advantage is possible because of the fact that the shaft sections 42 and 46 are not positively connected, the coupling 39 is removably telescoped upon the tube sections 35 and 38, and it is only necessary to loosen the nuts of bolts 28 in order to remove the motor.

Although only one form of the invention has been shown and described in detail, it will be apparent to those skilled in the art that the invention is not so limited, but that various changes may be made therein without departing from the spirit of the invention or from the scope of the appended claims.

What we claim is:

1. In a windshield mounting for vehicles, a frame member constituting a part of the windshield receiving structure, a windshield cleaner motor, means on one side of the frame member independent thereof and having portions extending to the other side of the frame member for detachably supporting the cleaner motor, a support for said means, wiper actuating mechanism supported by said means on the side of the frame member opposite the motor, said motor and mechanism having engaging connecting members extending freely through the frame member and being freely separable axially with respect to each other when the motor supporting means is released.

2. In a vehicle mounting for windshield cleaners, a pair of spaced frame members for receiving a portion of a slidable windshield therebetween, a windshield cleaner motor, means on one of the frame members for supporting the cleaner motor, the other frame member having openings for receiving portions of said means freely therethrough whereby the cleaner motor is supported outside the space between said frame members, windshield wiper actuating mechanism mounted upon one of the frame members and in the space between said spaced frame members, said motor and actuating mechanism having means for detachably engaging them by movement of the latter toward each other, said means being dependent upon the motor supporting means for establishing an actuating drive from the motor to the wiper actuating mechanism.

3. In a vehicle mounting for windshield cleaners, a pair of spaced frame members for receiving a portion of a slidable windshield therebetween, a windshield cleaner motor, a bracket mounted on one of the frame members and disposed in the space between said spaced frame members, motor securing means on said bracket extending freely through the other frame member whereby the cleaner motor is detachably mounted outside the space between said frame members, windshield wiper actuating linkage carried upon the same frame member as the bracket, and a detachable connection between said motor and actuating mechanism dependent upon the motor securing means for establishing an actuating drive from the motor to the wiper actuating mechanism.

4. In a windshield mounting for vehicles, inner and outer frame members for receiving a portion of the slidable windshield therebetween, a windshield cleaner motor, a channel bracket mounted upon the outer frame member in the space between the two frame members, means extending from the bracket freely through the inner frame member for detachably supporting the cleaner motor, wiper actuating linkage mounted upon the bracket, detachable sectional shaft portions operatively secured to the linkage and motor respectively and constituting a drive between the motor and linkage and being automatically disconnected upon removal of the motor from its detachable supporting means.

5. In a windshield mounting for vehicles, a vehicle frame construction including a removable header member defining one wall portion of a space partially surrounded by the frame construction, a cleaner motor disposed adjacent one side of the header member opposite the space; wiper actuating mechanism disposed in said space and including a bracket carried by the frame construction adjacent the other side of the header member, means extending from the bracket freely through the header member and supporting the cleaner motor in detachable relation to provide for the removal of the motor and the removal of the header member without affecting said bracket and mechanism, a shaft section having a rigid arm and being detachably engaged with the motor, means for assembling the shaft section as a part of said mechanism, a wiper oscillating crank mounted in the frame construction, and a link connecting said rigid arm and crank to transmit power from the motor to the wiper oscillating shaft, said mechanism being in the form of a unitary mounting for installation independently of the cleaner motor.

6. In a windshield mounting for vehicles, vehicle frame construction including a removable header member and defining one wall portion of a space partially surrounded by the frame construction, a cleaner motor disposed adjacent one side of said header member opposite the space; wiper actuating mechanism disposed in said space and mounted upon a portion of the frame construction other than the header member and adjacent the opposite side of the header member, said mechanism including means extending freely through the header member and detachably supporting the cleaner motor independently of the header member to provide for the removal of the motor and the removal of the header member without affecting said mechanism, a shaft section included in the mechanism and a shaft section on the motor, said sections having notch and tenon-like connections between them and being freely detachable when moved axially apart, said mechanism being in the form of a unitary mounting for installation independently of the cleaner motor.

7. In a windshield mounting for vehicles, a vehicle frame construction including a removable header member defining one wall portion of a space partially surrounded by the frame construction, a cleaner motor disposed adjacent one side of said header member opposite the space; wiper actuating mechanism disposed in said space and mounted upon a portion of the frame construction other than the header member and adjacent the opposite side of the header member, said header member being removable without removing the wiper actuating mechanism, means carried by the frame construction and having portions extending freely through the header member, means connecting said portions to the motor to support the latter independently of said header member; said mechanism including a shaft connection having a rigid arm thereon, wiper oscillating rock shafts having rigid arms thereon, links connecting the rigid arms, bearing members carried by the rock shafts and adapted to be secured in the frame construction for positioning the rock shafts, and means on the bearing members for limiting movement of the rock shafts in the bearings.

8. In a windshield cleaner, a unitary mechanism adapted to be mounted as a unit in a vehicle header construction, said unitary mechanism including a channel bracket having attaching means for rigidly mounting it upon a vehicle member, a shaft section rotatably supported in the bracket and having a crank arm extending rigidly therefrom, said shaft section having thereon one element of a notch and tenon-like connection for detachable engagement with a cleaner motor shaft whereby the shaft section and shaft form substantially axially alined sections of a sectional shaft, a plurality of rock shafts having rigid crank arms thereon, a plurality of bearing brackets rotatably carried by the rock shafts as parts of the unit spaced from the channel bracket for mounting and supporting them in frame portions of the vehicle, and links pivotally connecting the rigid arms of the rock shaft to the rigid arm of the shaft section for transmission of rocking motion.

9. In a windshield cleaner, a unitary mechanism adapted to be mounted as a unit in a vehicle header construction said mechanism including a bracket having attaching means for rigidly securing it upon a vehicle member, a shaft section rotatably supported in the bracket and having an arm extending rigidly therefrom, said shaft section having thereon one element of a connection for freely detachable engagement with a cleaner motor shaft, a rock shaft having a rigid rock arm thereon, a mounting member separate from the bracket and including a bearing receiving the rock shaft for supporting said rock shaft upon a frame portion of the vehicle, a link pivotally connecting the rigid arm of the shaft section to said rock arm for transmitting oscillatory movement from the shaft section to the rock shaft, and stop means mounted in cooperation with the link, mounting member and rock arm and operable prior to the installation of said unitary mechanism for limiting relative movement of the rock arm and mounting member and preventing the rigid arm from reaching a dead center position with respect to the link after installation in the vehicle.

HENRY HUEBER.
ERWIN C. HORTON.